United States Patent
Yu (10) Patent No.: US 11,376,970 B2
(45) Date of Patent: Jul. 5, 2022

(54) DRIVE SYSTEM OF AN ELECTRIC VEHICLE

(71) Applicants: HYUNDAI MOTOR COMPANY, Seoul (KR); KIA MOTORS CORPORATION, Seoul (KR)

(72) Inventor: Seung Wan Yu, Yeosu-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 84 days.

(21) Appl. No.: 16/860,884

(22) Filed: Apr. 28, 2020

(65) Prior Publication Data
US 2021/0162873 A1 Jun. 3, 2021

(30) Foreign Application Priority Data
Dec. 3, 2019 (KR) .................... 10-2019-0158713

(51) Int. Cl.
*B60L 50/71* (2019.01)
*B60G 11/27* (2006.01)
(Continued)

(52) U.S. Cl.
CPC .............. *B60L 50/71* (2019.02); *B60G 11/27* (2013.01); *B60K 1/04* (2013.01); *B60K 17/04* (2013.01);
(Continued)

(58) Field of Classification Search
CPC .......... B60L 50/71; B60L 50/75; B60G 11/27; B60K 1/04; B60K 17/04; B60K 6/26;
(Continued)

(56) References Cited

U.S. PATENT DOCUMENTS

| 718,639 A * | 1/1903 | Lasche ..................... B61C 9/44 |
| | | 105/139 |
| 2007/0175681 A1* | 8/2007 | King ....................... B60K 6/26 |
| | | 903/906 |

(Continued)

FOREIGN PATENT DOCUMENTS

| CN | 103832236 A * | 6/2014 |
| JP | 2008150026 A | 7/2008 |

(Continued)

*Primary Examiner* — James A Shriver, II
*Assistant Examiner* — Michael T. Walsh
(74) *Attorney, Agent, or Firm* — Lempia Summerfield Katz LLC (57) ABSTRACT

A drive system of an electric vehicle is disclosed. The vehicle has an arrangement optimized for characteristics of a hydrogen electric truck so as to ensure an available space inside vehicle body frames, thereby allowing a battery, high-voltage electric parts, a hydrogen tank, and the like to be arranged inside the vehicle body frames and increasing space utilization in the vehicle. The drive system includes a motor configured to drive the vehicle, a reducer or a transmission connected to an output side of the motor so as to change a rotational speed of the motor, and a rear axle configured to transmit rotating power output from the reducer or the transmission to vehicle wheels. The motor and the reducer or the transmission together with the rear axle are mounted on a suspension.

15 Claims, 7 Drawing Sheets

(51) Int. Cl.
    *B60K 1/04*         (2019.01)
    *B60K 17/04*       (2006.01)
    *B62D 21/11*       (2006.01)
    *B60L 50/75*        (2019.01)
    *B60K 1/00*         (2006.01)
    *B60K 6/26*         (2007.10)

(52) U.S. Cl.
    CPC ................ *B62D 21/11* (2013.01); *B60K 6/26* (2013.01); *B60K 2001/001* (2013.01); *B60L 50/75* (2019.02); *B60Y 2200/91* (2013.01); *B60Y 2200/92* (2013.01)

(58) Field of Classification Search
    CPC .... B60K 2001/001; B60K 1/00; B62D 21/11; B60Y 2200/91; B60Y 2200/92
    See application file for complete search history.

(56)     References Cited

U.S. PATENT DOCUMENTS

| | | | |
|---|---|---|---|
| 2008/0149410 A1 | 6/2008 | Yang | |
| 2009/0145674 A1* | 6/2009 | Lee | B60L 50/40 180/65.1 |
| 2010/0116569 A1* | 5/2010 | Morrow | B60W 10/08 180/65.1 |
| 2013/0075183 A1* | 3/2013 | Kochidomari | B60K 17/043 180/292 |
| 2013/0133180 A1* | 5/2013 | Neis | B60K 17/356 903/903 |
| 2013/0306394 A1* | 11/2013 | Theodore | B60K 6/50 180/291 |
| 2014/0358340 A1* | 12/2014 | Radev | B60K 6/442 701/22 |
| 2019/0001963 A1* | 1/2019 | Kim | B60W 10/08 |
| 2019/0023117 A1* | 1/2019 | Wolff | B60L 50/16 |
| 2019/0202312 A1* | 7/2019 | Aufdencamp | B60K 6/52 |
| 2020/0086731 A1* | 3/2020 | Yohannes | B60K 5/1208 |

FOREIGN PATENT DOCUMENTS

| | | | | |
|---|---|---|---|---|
| KR | 20110088552 A | * | 8/2011 | ................ B60K 6/52 |
| TW | 201700316 A | * | 1/2017 | |
| WO | 2010026175 A1 | | 3/2010 | |
| WO | WO-2017106620 A1 | * | 6/2017 | ........... B60B 35/122 |
| WO | WO-2017193130 A1 | * | 11/2017 | ............... B60K 1/00 |
| WO | WO-2019044262 A1 | * | 3/2019 | ............. B60G 11/04 |

\* cited by examiner

DRIVE SYSTEM OF AN ELECTRIC VEHICLE

CROSS-REFERENCE TO RELATED APPLICATION

This application claims under 35 U.S.C. § 119(a) the benefit of priority to Korean Patent Application No. 10-2019-0158713 filed on Dec. 3, 2019, the entire contents of which are incorporated herein by reference.

BACKGROUND

(a) Technical Field

The present disclosure relates to a drive system of an electric vehicle. More particularly, it relates to a drive system of an electric vehicle which includes a motor, a reducer, and an axle for driving the electric vehicle.

(b) Background Art

Recently, vehicles driven by driving a motor using electrical energy charged in a battery without using fossil fuel, such as gasoline or diesel, are being developed, such as a pure electric vehicle, a fuel cell vehicle, a hybrid electric vehicle, and the like.

The pure electric vehicle is a battery electric vehicle in which a battery alone is mounted as a high voltage power supply and a motor is driven using electrical energy charged in the battery.

Further, the fuel cell vehicle is a vehicle in which both a fuel cell using hydrogen fuel and a battery are mounted as high voltage power supplies and a motor is driven using power generated by the fuel cell and power charged in the battery. The hybrid electric vehicle is a vehicle which is driven using both a motor and an engine as hybrid drive sources.

The fuel cell vehicle and the hybrid electric vehicle are also driven by power of the motor by driving the motor using electrical energy and may thus be referred to as electric vehicles in a broad sense.

Research has been conducted on extended application of a drive system for electric vehicles which drives a vehicle using a motor not only to cars but also to commercial vehicles, such as trucks or buses.

For example, a hydrogen electric truck or a hydrogen electric bus in which a fuel cell, which is a kind of power generation apparatus, is mounted has been actively developed as a solution to overcome a battery capacity problem in large vehicles, such as trucks, buses, and the like.

Figure 1:
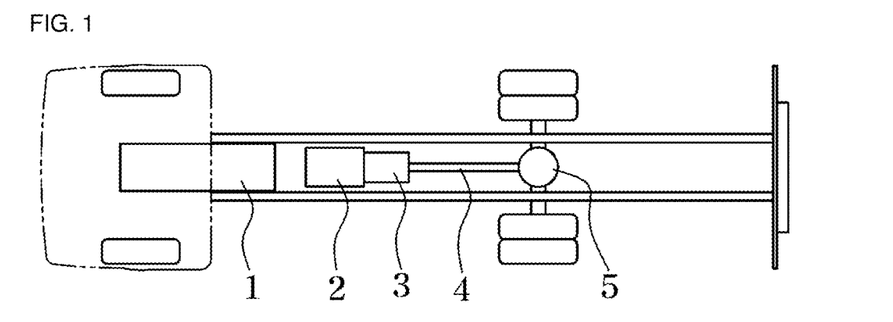
FIG. 1 is a view illustrating an arrangement of a drive system in a conventional hydrogen electric truck.

FIG. 1 is a view illustrating a drive system of a hydrogen electric truck, in which the following are arranged: a fuel cell 1 serving as a main power source (an electric power source); a motor 2 serving as a drive device to drive the vehicle; a transmission (or a reducer) 3 to change the rotational speed of the motor 2; a propeller shaft 4 to transmit rotating power output from the transmission 3; and a rear axle 5 to transmit the rotating power transmitted through the propeller shaft 4 to vehicle wheels.

This arrangement of the drive system is the same as one applied to a truck in which a diesel engine is mounted. In other words, the electric truck uses the arrangement of the drive system, similar to that of the diesel truck, including the motor 2, the transmission 3, and the rear axle 5.

If the arrangement of the drive system applied to the diesel truck is applied to the hydrogen electric truck, parts for diesel engines may be applied thereto. Thus, the configuration of the system may be simple and a part development period may be shortened.

On the other hand, if the arrangement of the drive system applied to the diesel truck is applied to the hydrogen electric truck as it is, the drive system including the motor 2, the transmission 3, and the rear axle 5 occupies the entire space inside vehicle body frames. Thus, a battery, a controller, high-voltage electric parts, a hydrogen tank, and the like must be arranged outside the vehicle body frames.

Accordingly, a drive system having an improved arrangement in which an available space inside vehicle body frames may be ensured so that a battery, high-voltage electric parts, a hydrogen tank, and the like may be arranged inside the vehicle body frames is required.

SUMMARY OF THE DISCLOSURE

The present disclosure has been made in an effort to solve the above-described problems associated with the prior art. It is an object of the present disclosure to provide a drive system of an electric vehicle having an arrangement optimized for characteristics of a hydrogen electric truck so as to ensure an available space inside vehicle body frames. Thus, the vehicle body may allow a battery, high-voltage electric parts, a hydrogen tank, and the like to be arranged inside the vehicle body frames and to increase space utilization in the vehicle.

In one aspect, the present disclosure provides a drive system of an electric vehicle. The drive system includes a motor configured to drive the electric vehicle, one of a reducer or a transmission connected to an output side of the motor so as to change a rotational speed of the motor, and a rear axle configured to transmit rotating power output from the reducer or the transmission to vehicle wheels. The motor and the reducer or the transmission together with the rear axle are mounted on a suspension.

In an embodiment, an output side of the one of the reducer or the transmission may be directly connected to the rear axle so as to form an integral structure in which the motor, the reducer or the transmission, and the rear axle are directly connected.

In another embodiment, the rear axle, the one of the reducer or the transmission, and the motor may be sequentially arranged in forward and backward directions of a vehicle body.

In still another embodiment, the one of the reducer or the transmission and the motor may be arranged at the rear of the rear axle in forward and backward directions of a vehicle body.

In yet another embodiment, the motor, the one of the reducer or the transmission, and the rear axle may be arranged in an inner space between left and right vehicle body frames arranged in forward and backward directions of a vehicle body.

In still yet another embodiment, the motor, the one of the reducer or the transmission, and the rear axle may be located under the left and right vehicle body frames so as not to protrude upwards from upper ends of the left and right vehicle body frames.

In a further embodiment, the electric vehicle may be a hydrogen electric truck provided with a fuel cell mounted therein, and a space to accommodate a battery or a hydrogen tank arranged therein may be prepared in front of the rear axle within the inner space between the left and right vehicle body frames.

In another further embodiment, the drive system may further include a mounting structure configured to mount and support the motor on left and right lower arms of the suspension and configured to support air springs arranged between the suspension and vehicle body frames.

In still another further embodiment, the mounting structure may include a sub-frame installed to connect the left and right lower arms of the suspension and insulators interposed between the sub-frame and the motor.

In yet another further embodiment, the sub-frame may be located under the motor and support the motor in a state in which the insulators are interposed between an upper surface of the sub-frame and a lower surface of the motor.

In still yet another further embodiment, coupling positions between the lower arms and the sub-frame may be set to be located directly under the air springs of the suspension supported by upper portions of the lower arms, such that the sub-frame may be located directly under the air springs.

In a still further embodiment, a middle portion of the sub-frame may have a downwardly bent shape corresponding to a lower surface of the motor having a cylindrical shape. The insulators may be interposed between left and right sides of the lower surface of the motor and left and right sides of an upper surface of the sub-frames corresponding thereto.

In a yet still further embodiment, each of the insulators may include a first plate coupled to the sub-frame, a second plate coupled to the motor, and an elastic member interposed between the first plate and the second plate.

In still yet another further embodiment, motor brackets may be installed on an outer surface of the motor and the second plate of each of the respective insulators may be coupled to each of the respective motor brackets.

In a still further embodiment, the electric vehicle may be an electric truck and the electric vehicle may be a hydrogen electric truck provided with a fuel cell mounted therein.

Other aspects and embodiments of the present disclosure are discussed below.

The above and other features of the present disclosure are also discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes may be determined in part by the particular intended application and use environment.

In the figures, reference numbers refer to the same or equivalent parts of the present disclosure throughout the several figures of the drawings.

DETAILED DESCRIPTION

Hereinafter, reference is made in detail to various embodiments of the present disclosure, examples of which are illustrated in the accompanying drawings and described below. While the disclosure is described in conjunction with various embodiments, it should be understood that the present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

In the following description of the embodiments, it is understood that, when a part "includes" an element, the part may further include other elements, and does not exclude the presence of other elements unless stated otherwise.

Further, to clarify the use in the pending claims and to hereby provide notice to the public, the phrases "one of <A>, <B>, . . . and <N>" or "at least one of <A>, <B>, . . . <N>, or combinations thereof" are defined by the applicant in the broadest sense, superseding any other implied definitions here before or hereinafter unless expressly asserted by the applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
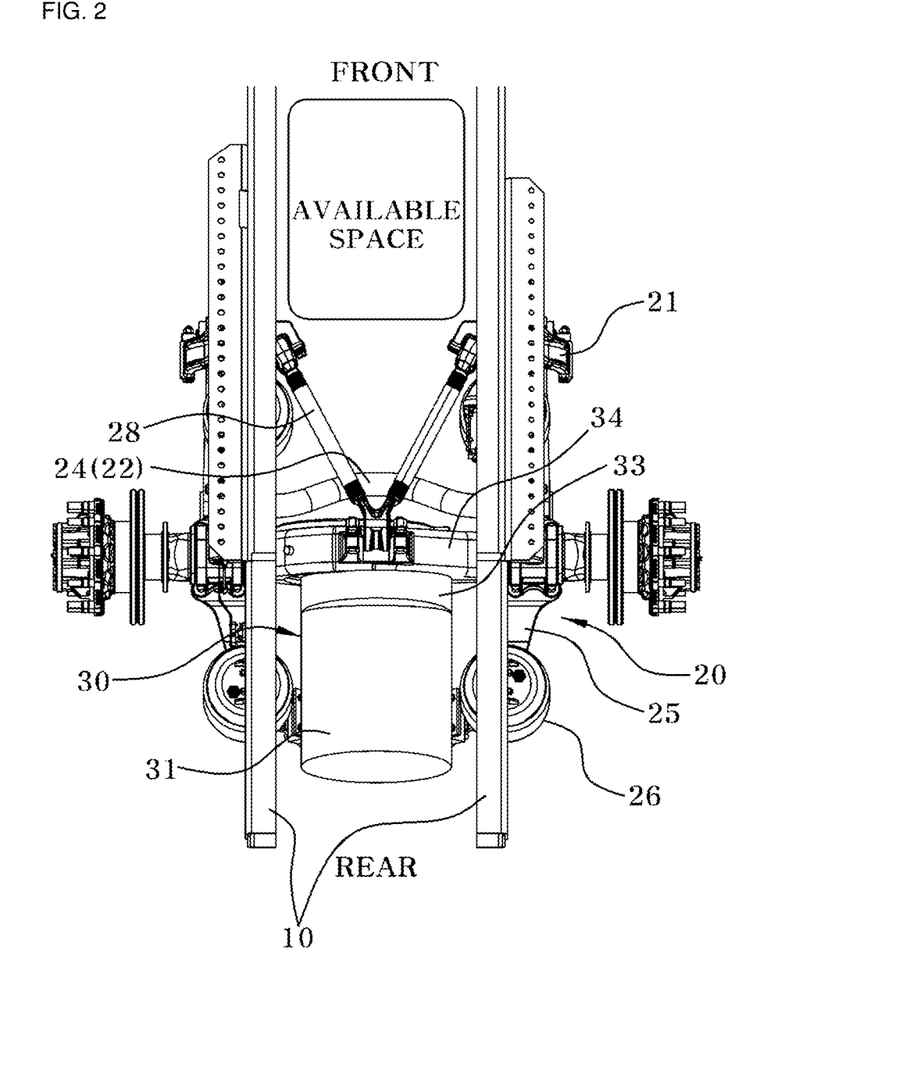
FIG. 2 is a plan view illustrating a drive system of an electric truck according to one embodiment of the present disclosure.
Figure 3:
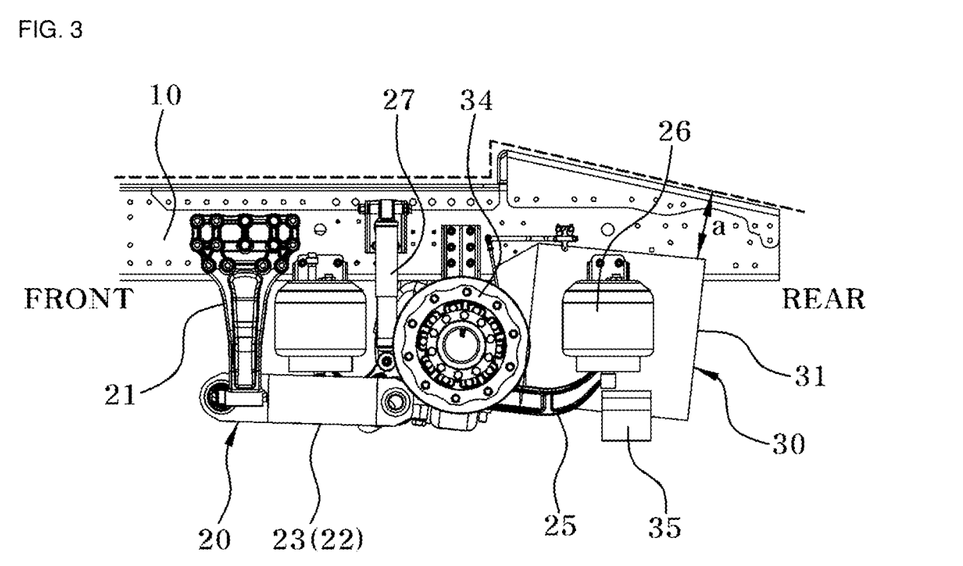
FIG. 3 is a side view illustrating the drive system according to one embodiment of the present disclosure.

FIG. 2 is a plan view illustrating a drive system of an electric truck according to one embodiment of the present disclosure. FIG. 3 is a side view illustrating the drive system according to one embodiment of the present disclosure.

Figure 4:
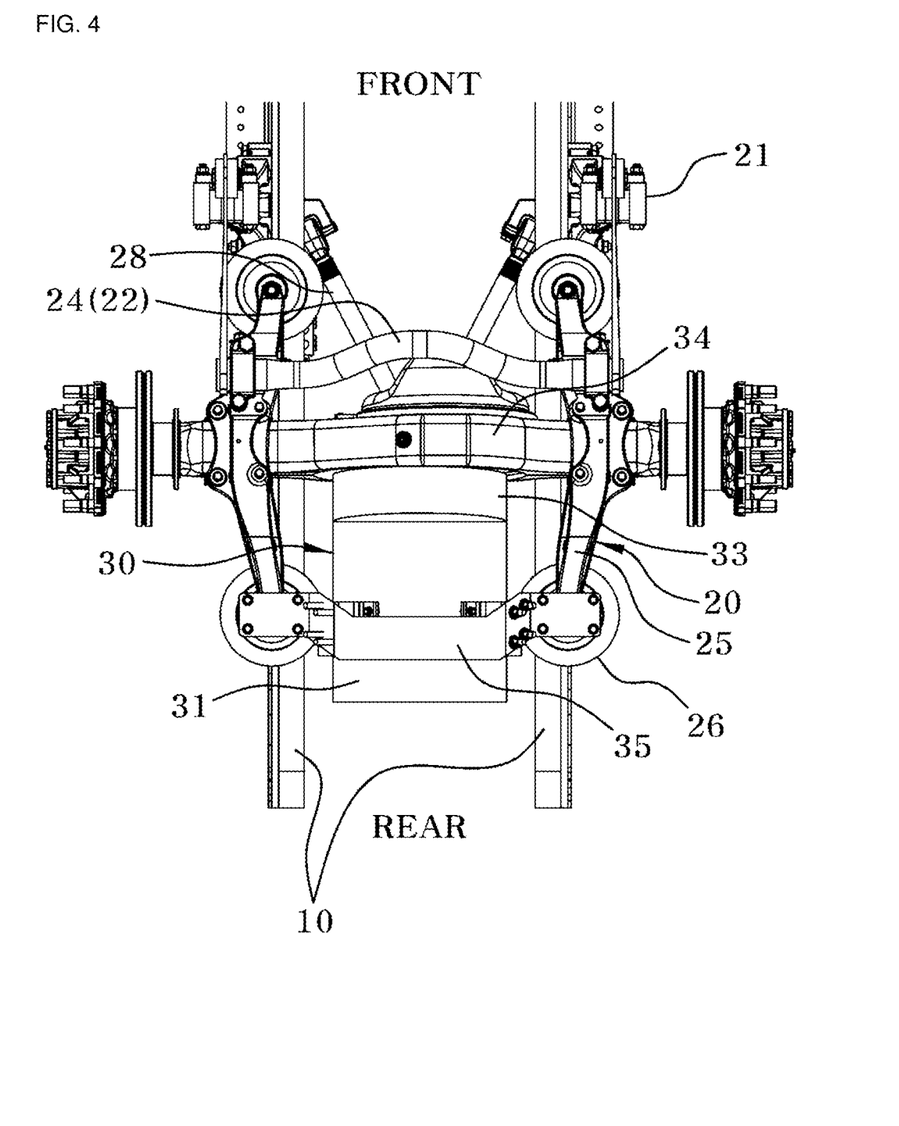
FIG. 4 is a bottom view illustrating the drive system according to one embodiment of the present disclosure.
Figure 5:
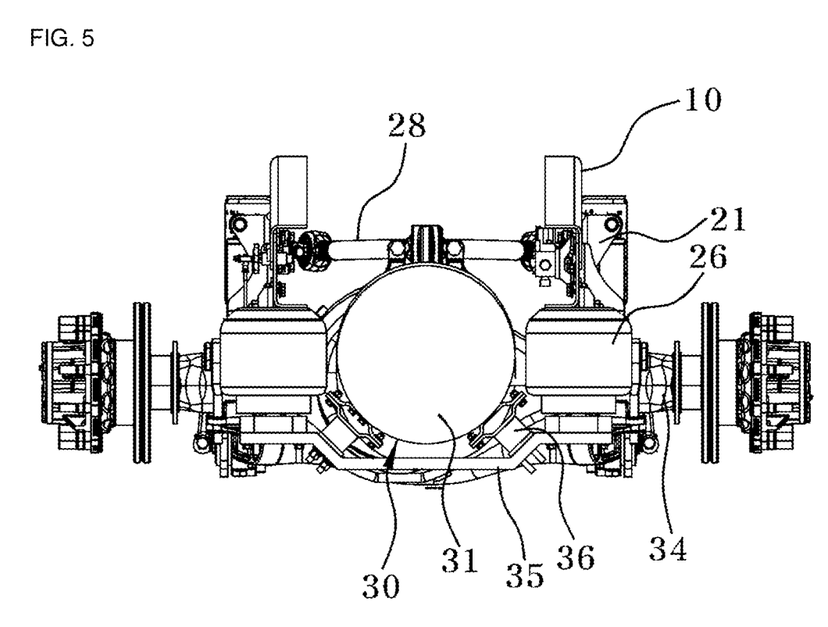
FIG. 5 is a rear view illustrating the drive system according to one embodiment of the present disclosure.

Further, FIG. 4 is a bottom view illustrating the drive system according to one embodiment of the present disclosure. FIG. 5 is a rear view illustrating the drive system according to one embodiment of the present disclosure.

The present disclosure relates to a drive system of an electric vehicle, and more particularly to a drive system of an electric vehicle which is driven by a motor.

Further, a drive system according to one embodiment of the present disclosure may be a rear wheel drive system of an electric vehicle including a rear axle. The electric vehicle may be an electric truck, more particularly, a hydrogen electric truck in which a fuel cell using hydrogen as fuel is mounted.

As is generally known, the hydrogen electric truck is driven by driving a motor using power generated by a fuel cell and power charged in a battery. The fuel cell is a kind of power generation apparatus which converts chemical energy of fuel into electrical energy through an electrochemical reaction between hydrogen serving as fuel gas and oxygen in the air serving as oxidant gas.

FIG. 2 is a plan view of a drive system 30 of a vehicle which is viewed from above. In this figure, an upward direction is a forward movement direction of the vehicle.

Therefore, in FIG. 2, an upper region is a front portion of the vehicle and a lower region is a rear portion of the vehicle based on the forward and backward directions of a vehicle body.

As shown in FIG. 2, the drive system 30 according to the present disclosure is located under vehicle body frames 10. Particularly, the drive system 30 according to the present disclosure is disposed in an inner space between the two vehicle body frames, i.e., left and right vehicle body frames 10, disposed parallel to each other so as to extend in the forward and backward direction of the vehicle body.

Referring to FIG. 3, the drive system 30 according to the present disclosure together with a suspension 20 is disposed under the vehicle body frames 10. The drive system 30 is disposed so as not to protrude upwards from the upper ends of the vehicle body frames 10 even when full bumping of a motor 31 and the like of the drive system 30 occurs.

For this purpose, a vertical gap a (in FIG. 3) between the upper ends of the vehicle body frames 10 and the upper end of the motor 31 must be appropriately set.

Further, the drive system 30 according to the preset disclosure serves to drive rear wheels, and includes the motor 31, a reducer 33 or a transmission, a rear axle 34, and a mounting structure to fix these elements to the vehicle body frames 10.

The motor 31 is a drive apparatus to drive the vehicle, i.e., a drive motor 31 serving as a vehicle drive source. In the present disclosure, the motor 31 is arranged at the rear portion of the vehicle such that an output side of the motor 31 faces the front portion of the vehicle.

Further, the reducer 33 or the transmission (hereinafter commonly called the reducer) is arranged in front of the output side of the motor 31. In this case, the reducer 33 is connected to the output side of the motor 31 so as to receive power transmitted from the motor 31.

In the present disclosure, the reducer 33 may be a multi-speed reducer, or a transmission, more particularly a multi-speed transmission. Additionally, the reducer 33 may be arranged such that an output side of the reducer 33 faces the front portion of the vehicle.

The rear axle 34 is arranged in front of the output side of the reducer 33, and the rear axle 34 is connected to the output side of the reducer 33 so as to receive rotating power reduced by the reducer 33.

In the rear axle 34, a shaft is arranged within an axle housing so as to extend in the leftward and rightward directions, thus being connected to left and right wheels.

Referring to FIG. 2, the motor 31 is arranged at the rear portion of the vehicle, the reducer 33 (or the transmission) is arranged in front of the output side of the motor 31, and the output side of the reducer 33 is directly connected to the rear axle 34 arranged in front of the output side of the reducer 33.

In other words, in the present disclosure, both the motor 31 and the reducer 33 are arranged close the rear axle 34 in the rear portion of the vehicle, the motor 31 and the reducer 33 are disposed at the rear of the rear axle 34, and the reducer 33 is directly connected to the rear axle 34 without a propeller shaft.

As such, the drive system 30 according to the present disclosure has an integrated modularized motor-reducer-rear axle configuration in which the motor 31 and the reducer 33 are directly connected to the rear axle 34.

The drive system 30 according to the present disclosure includes an E-axle having the above integrated modularized configuration, i.e., a configuration in which the axle 34, the reducer 33 and the motor are directly connected to each other and are sequentially arranged in the forward and backward directions of the vehicle body.

The above-described drive system 30 in which the motor 31 and the reducer 33 are integrally modularized with the rear axle 34 has advantages, such as reduction in the number of parts, minimization of problems with connection parts and boundary parts, reduction in a space occupied by the drive system 30 when the drive system 30 is mounted in the vehicle, and reduction in material costs.

In FIGS. 2-5, reference numeral 20 indicates a suspension. The suspension 20 is located between the axle housing in which the shaft is installed and the vehicle body frames 10 and absorbs vibration in the upward and downward directions.

The suspension 20 is configured such that mounting brackets 21 are fixedly installed on the two vehicle body frames 10, i.e., the left and right vehicle body frames 10. A stabilizer link 22 is coupled to the lower ends of both mounting brackets 21.

The stabilizer link 22 includes link main bodies 23 which are connected to the lower ends of the respective mounting brackets 21 and extend in the forward and backward directions. A rod part 24 is arranged to bilaterally connect the left and right link main bodies 23.

Further, lower arms 25 which extend in the forward and backward directions are coupled to left and right sides of the stabilizer link 22. Air springs 26 and shock absorbers 27 which are arranged in a space with the vehicle body frames 10 are installed at the lower arms 25.

The axle housing of the rear axle 34 is mounted on the lower arms 25, and radius rods 28 are arranged to connect the respective mounting brackets 21 and the axle housing of the rear axle 34.

In the drive system 30 according to one embodiment of the present disclosure, the mounting structure to fix and support the motor 31, the reducer 33, and the rear axle 34 to and on the vehicle body frames 10 includes a sub-frame 35, which is installed on the suspension 20 so as to mount the motor 31 thereon to support the motor 31 and insulators 36.

The lower arms 25 are supported on the vehicle body frames 10 by the mounting brackets 21 and the stabilizer link 22, as described above, and are arranged below the vehicle body frames 10 so as to extend in the forward and backward directions.

Further, the sub-frame 35 which extends in the leftward and rightward directions, i.e., the transverse direction, is installed between the left and right lower arms 25. Coupling positions between the lower arms 25 and the sub-frame 35 may be set to be located directly under the air springs 26.

In other words, the sub-frame 35 is installed at the lower arms 25 so as to be located directly under the left and right air springs 26.

Both ends of the sub-frame 35 are integrally fastened to the lower portions of the rear ends of the left and right lower arms 25, and particularly, are arranged below the motor 31 so as to cross between the left and right lower arms 25.

Further, the sub-frame 35 is coupled to the motor 31 located thereabove by the insulators 36.

In other words, the sub-frame 35 is fixedly installed on the suspension 20 so as to extend in the leftward and rightward directions, i.e., the transverse direction, below the vehicle body frames 10. In this case, the motor 31 is mounted on the sub-frame 35 by the insulators 36 so as to be supported by the sub-frame 35.

Accordingly, in the present disclosure, the motor 31 and the reducer 33 together with the rear axle 34 are mounted on the suspension 20.

Since the sub-frame 35 is coupled to the lower arms 25 of the suspension 20, provided with the air springs 26 installed thereon, the motor and the rear axle 34 (the axle housing) are moved together with the suspension 20 by the sub-frame 35 during behavior of the suspension 20. Thus, load applied to parts for connecting the motor 31, the reducer 33, and the rear axle 34 may be minimized.

If the motor 31 and the reducer 33 are directly mounted on the vehicle body frames 10, all the displacement of the suspension 20 must be absorbed by the insulators 36 and the like.

Further, in one embodiment of the present disclosure, the insulators 36 interposed between the sub-frame 35 and the motor 31 are located under the motor 31. The insulators 36 are interposed between the upper surface of the sub-frame 35 and the lower surface of the motor 31, as shown in FIG. 5.

Since the motor 31 including a motor housing generally has a cylindrical shape, the sub-frame 35 must have a shape corresponding to the shape of the motor 31 so as to stably support the cylindrical motor 31 from below. Thus, the middle portion of the sub-frame 35 must have a downwardly bent shape, as shown in FIG. 5.

Thus, the upper surface of the sub-frame 35 and the lower surface of the motor 31 are adhered to each other by the insulators 36. The upper surface of the sub-frame 35 and the lower surface of the motor 31 are coupled to each other by the insulators 36 at two positions on the lower surface of the motor 31 which are spaced apart from each other in the transverse direction of the vehicle body, as shown in FIG. 5.

As such, the insulators 36 and the mounting points are located on the lower surface of the motor 31. If the insulators 36 are located on the side surface of the motor 31 rather than on the lower surface of the motor 31, the insulators 36 may interfere with the air springs 26 of the suspension 20.

When spaces between the motor 31 and the air springs 26 are narrow and thus interference between the motor 31 and the air springs 26 occurs due to behavior of the vehicle, the air springs 26 may be damaged due to interference with the motor 31.

Further, if the insulators 36 and the mounting points are located on the upper surface of the motor 31, a pendulum-type mounting system is formed resulting in poor behavior control of the motor 31 during a sudden start of the vehicle.

Further, it is necessary to appropriately set the positions of the insulators 36 and the mounting points so that the drive system 30 does not protrude upwards from the upper ends of the vehicle body frames 10 even when full bumping occurs.

Figure 6:
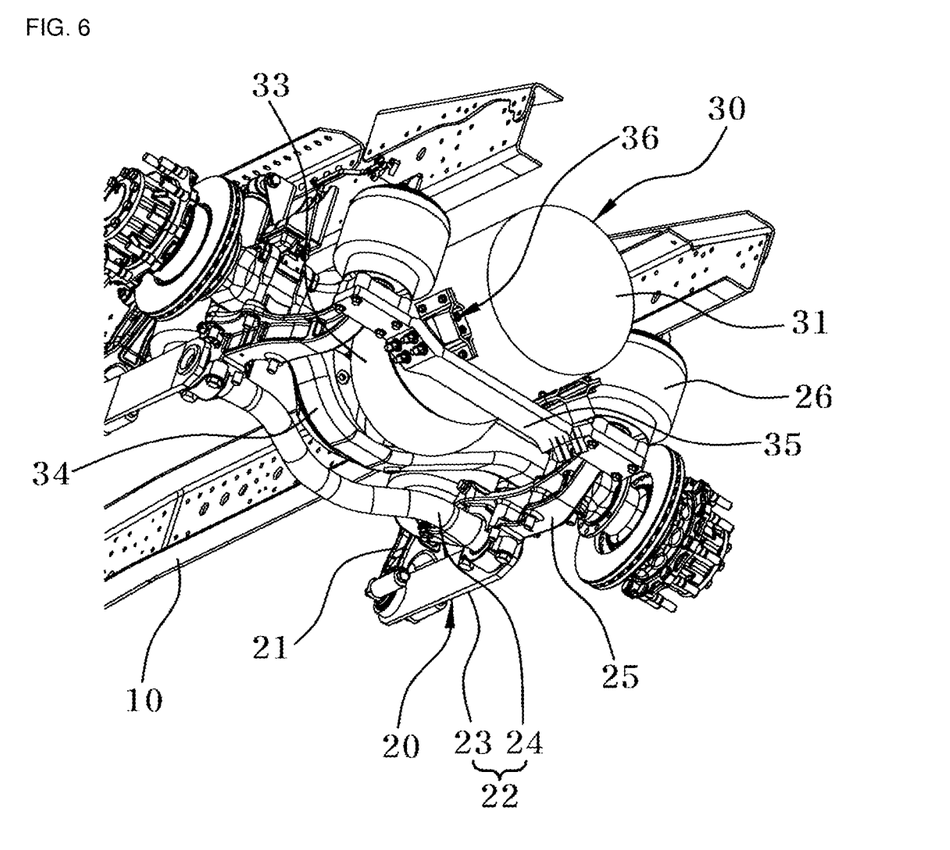
FIG. 6 is a perspective bottom view illustrating the drive system according to one embodiment of the present disclosure.
Figure 7:
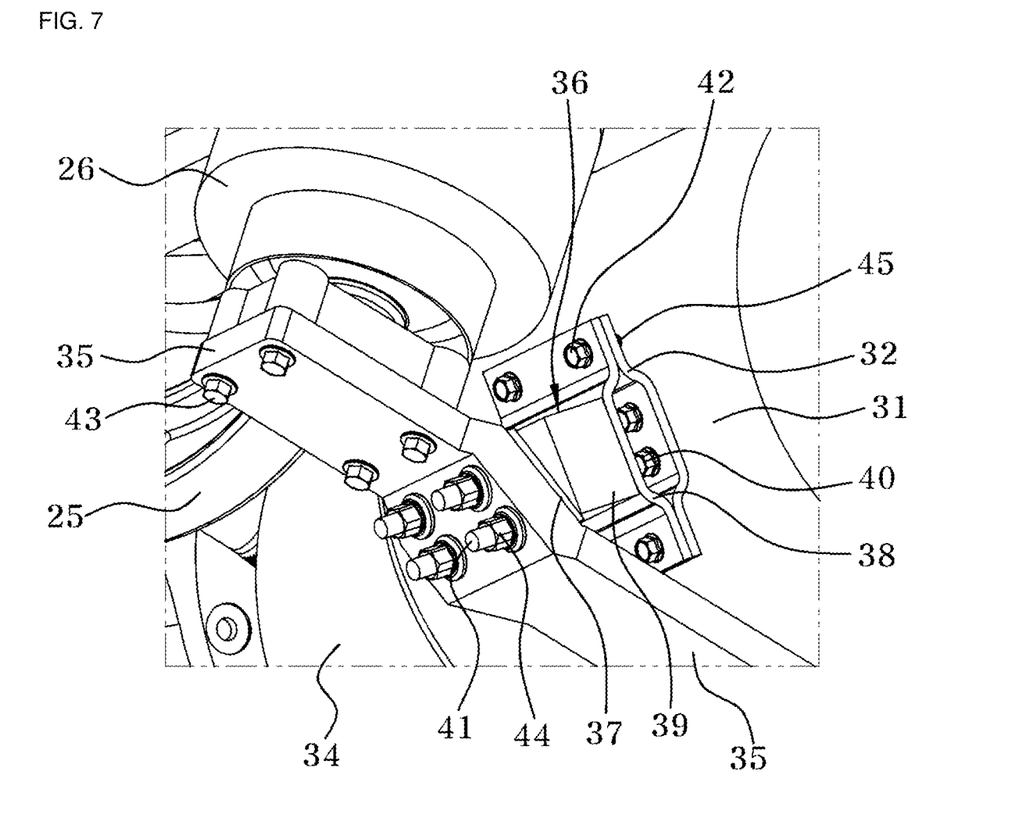
FIG. 7 is an enlarged view illustrating in detail a motor mounting structure of the drive system according to one embodiment of the present disclosure.

FIG. 6 is a perspective bottom view illustrating the drive system according to one embodiment of the present disclosure, and FIG. 7 is an enlarged view illustrating in detail a motor mounting structure of the drive system according to one embodiment of the present disclosure.

As a fastening method between the motor 31 and the sub-frame 35 and the motor mounting structure, motor brackets 32 are installed at positions on the outer surface of the motor 31 (the outer surface of the motor housing) which are fastened to the sub-frame 35.

The motor brackets 32 are fixed in a state in which the motor brackets 32 are connected to the outer surface of the motor 31. In this case, the motor brackets 32 may be fastened to the motor housing by bolts 40 so as to be fixed.

Thereafter, one side of each of the insulators 36 is coupled to each of the motor brackets 32, and the other side of each of the insulators 36 is coupled to the sub-frame 35.

In the present disclosure, the insulator 36 may include a first plate 37 coupled to the sub-frame 35, a second plate 38 coupled to the motor bracket 32, and an elastic member 39 interposed between the first plate 37 and the second plate 38. The elastic member 39 may be formed of rubber.

The elastic member 39 formed of rubber may be fixed between the first plate 37 and the second plate 38 by vulcanization molding. Thus, the first plate 37 and the second plate 38 may be integrated with the elastic member 39 formed of rubber in a vulcanized adhesion state.

Further, the insulator 36 may further include a plurality of bolts 41 installed on the first plate 37 and a plurality of nuts 44 coupled to the bolts 41. The bolts 41 may be installed such that head parts of the bolts 41 are inserted into the elastic member 39 and bodies of the bolts 41 pass through the first plate 37.

Further, the insulator 36 may further include a plurality of bolts 42 and a plurality of nuts 45 configured to fasten the second plate 38 to the motor bracket 32.

During assembly, as shown in FIG. 7, the first plate 37 is integrally coupled to the sub-frame 35 using the bolts 41 and the nuts 44 by inserting the respective bolts 41 installed on the first plate 37 into respective fastening holes formed in the sub-frame 35 and then fastening the nuts 44 to the bolts 41 at the other side of the sub-frame 35.

Further, in a state in which both ends of the sub-frame 35 are connected to the lower surfaces of the ends of the corresponding lower arms 25, the sub-frame 35 is fastened to the ends of the lower arms 25 and the air springs 26 by inserting bolts 43 into the ends of the sub-frame 35 from below.

Thus, the sub-frame 35 may be integrally coupled to the lower arms 25 and the air springs 26 as provided above. In this case, both ends of the second plates 38 become connected to both ends of the motor brackets 32.

Thereafter, in the above state in which both ends of the second plates 38 are connected to both ends of the motor brackets 32, the second plates 38 are integrally coupled to the motor brackets 32 using the bolts 42 and the nuts 45 by inserting the bolts 42 into fastening holes formed in the ends of the second plates 38 and the ends of the motor brackets 32, which coincide with each other, and then fastening the nuts 45 to the bolts 42 at the other side of the second plate 38.

As such, in the drive system 30 according to the present disclosure, the motor 31 is mounted to be located at the rear of the rear axle 34. A space in front of the drive system 30 in a wheel base section and an inner space between the left and right vehicle body frames 10 may be ensured as an available space, as shown in FIG. 2. The available space may be used as a space to mount a battery, a controller, high-voltage electric parts and a hydrogen tank therein. Thus, space utilization in the vehicle may be greatly increased.

Further, when the motor 31 is mounted, the lower portion of the motor 31 is supported by the sub-frame 35, thereby being capable of ensuring the gap between the upper end of the motor 31 and the upper ends of the vehicle body frames 10 and thus satisfying ISO Gooseneck regulations.

Further, since the motor 31 is supported by the sub-frame 35 connected to suspension 20, the motor 31 and the rear axle 34 may behave with the same trajectory during behavior of the vehicle and consequently minimize moment. Thus, it is possible to ensure reliability of the parts for connecting the motor 31, the reducer 33, and the rear axle 34.

In addition, since the rear axle 34 is mounted on the rear suspension 20 and the rear suspension 20 is mounted on the vehicle body frames 10, a distance between the center of the rear axle 34 and the center of gravity is not long.

Figure 8:
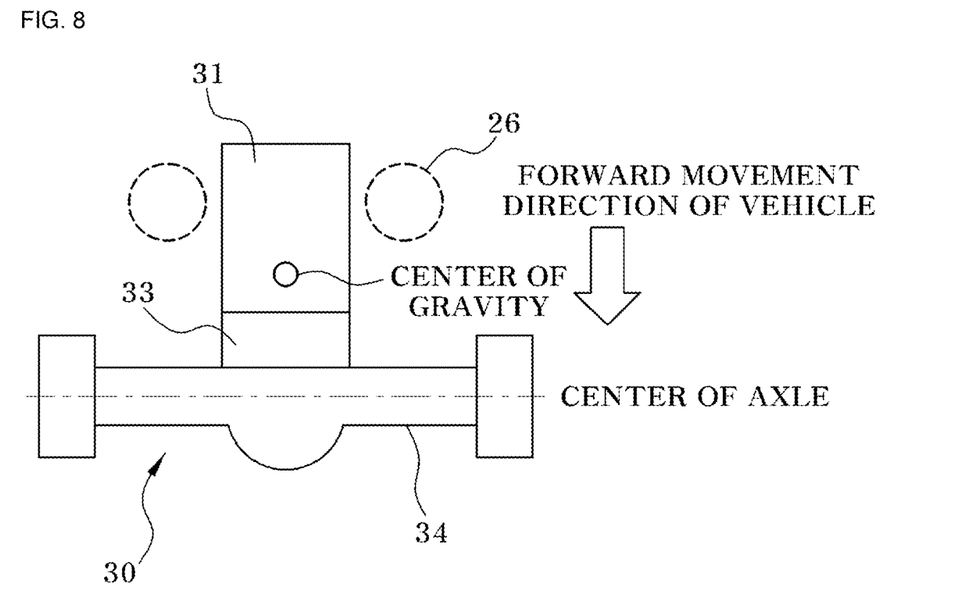
FIGS. 8 and 9 are views illustrating an arrangement state of a motor, a reducer and a rear axle in the forward and backward directions of a vehicle body in the drive system according to one embodiment of the present disclosure.
Figure 9:
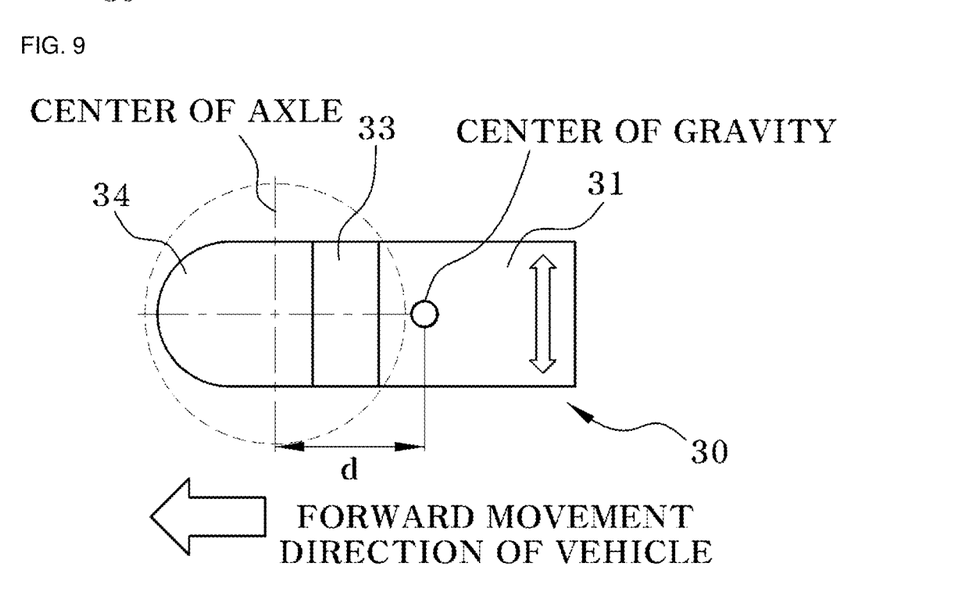

FIGS. 8 and 9 are views illustrating the arrangement state of the motor 31, the reducer 33, and the rear axle 34 in the forward and backward directions of the vehicle body in the drive system 30 according to one embodiment of the present disclosure. As shown in these figures, the motor 31 and the reducer 33 are arranged at the rear of the rear axle 34 in consideration of mountability of the battery, other electric parts, the hydrogen tank, and the like.

Further, a distance d between the center of the rear axle 34 and the center of gravity in the drive system 30 according to one embodiment of the present disclosure may be greatly reduced as compared to a conventional diesel truck. In the conventional diesel truck, the center of gravity is far away from the center of a rear axle due to a motor and thus a large moment is generated.

This configuration of the conventional diesel truck causes damage to parts for connecting the motor and a reducer and deformation of a connection shaft between the motor and the reducer, thereby causing problems, such as abnormal noise and premature damage to bearings.

In addition, the drive system 30 according to the present disclosure has improved maintainability and assembly performance. Thus, an integrated module in which the motor 31, the reducer 33 (or the transmission), and the rear axle 34 are assembled with the suspension 20 may be assembled and mounted from below the vehicle frame bodies 10.

This method is similar to the method applied to the conventional diesel truck, and thus, electric trucks may be assembled and manufactured in diesel truck assembly and production facilities without modifying the facilities.

In addition, even during maintenance, the module including the drive system 30 (i.e., the E-axle) and the suspension 20 may be separated downwards from the vehicle body frames 10 so as to be repaired. A hydrogen electric truck may be operated with maintainability and assembly performance which are on the same level as those of the conventional diesel truck.

Of course, the drive system 30 according to the present disclosure is advantageous not only in terms of inline investment costs and equipment costs but also in terms of equipment response of vehicle operation enterprises and maintenance enterprises.

As is apparent from the above description, a drive system of an electric vehicle according to the present disclosure has an arrangement optimized for characteristics of a hydrogen electric truck so as to ensure an available space inside vehicle body frames, thereby allowing a battery, high-voltage electric parts, a hydrogen tank, and the like to be arranged inside the vehicle body frames. This arrangement also increases space utilization in the vehicle.

The present disclosure has been described in detail with reference to embodiments thereof. However, it can be appreciated by those having ordinary skill in the art that changes may be made in these embodiments without departing from the principles and spirit of the present disclosure, the scope of which is defined in the appended claims and their equivalents.

What is claimed is:

1. A drive system of an electric vehicle, the drive system comprising:
   a motor configured to drive the electric vehicle;
   one of a reducer or a transmission connected to an output side of the motor so as to change a rotational speed of the motor;
   a rear axle configured to transmit rotating power output from the one of the reducer or the transmission to vehicle wheels; and
   a mounting structure configured to mount and support the motor on left and right lower arms of a suspension and configured to support air springs arranged between the suspension and vehicle body frames,
   wherein the mounting structure comprises: a sub-frame installed to connect the left and right lower arms of the suspension; and insulators interposed between the sub-frame and the motor, and
   wherein the motor and the one of the reducer or the transmission together with the rear axle are mounted on the suspension.

2. The drive system of claim 1, wherein an output side of the one of the reducer or the transmission is directly connected to the rear axle so as to form an integral structure in which the motor, the one of the reducer or the transmission, and the rear axle are directly connected.

3. The drive system of claim 2, wherein the rear axle, the one of the reducer or the transmission, and the motor are sequentially arranged in forward and backward directions of a vehicle body.

4. The drive system of claim 2, wherein the one of the reducer or the transmission and the motor are arranged at the rear of the rear axle in forward and backward directions of a vehicle body.

5. The drive system of claim 1, wherein the motor, the one of the reducer or the transmission, and the rear axle are arranged in an inner space between left and right vehicle body frames arranged in forward and backward directions of a vehicle body.

6. The drive system of claim 5, wherein the motor, the one of the reducer or the transmission, and the rear axle are located under the left and right vehicle body frames so as not to protrude upwards from upper ends of the left and right vehicle body frames.

7. The drive system of claim 5, wherein the electric vehicle is a hydrogen electric truck provided with a fuel cell mounted therein, and a space to accommodate a battery or a hydrogen tank arranged therein is prepared in front of the rear axle within the inner space between the left and right vehicle body frames.

8. The drive system of claim 1, wherein the sub-frame is located under the motor and supports the motor in a state in which the insulators are interposed between an upper surface of the sub-frame and a lower surface of the motor.

9. The drive system of claim 1, wherein coupling positions between the lower arms and the sub-frame are set to be located directly under the air springs of the suspension supported by upper portions of the lower arms, such that the sub-frame is located directly under the air springs.

10. The drive system of claim 1, wherein:
    a middle portion of the sub-frame has a downwardly bent shape corresponding to a lower surface of the motor having a cylindrical shape; and
    the insulators are interposed between left and right sides of the lower surface of the motor and left and right sides of an upper surface of the sub-frames corresponding thereto.

11. The drive system of claim 1, wherein each of the insulators comprises:
    a first plate coupled to the sub-frame;
    a second plate coupled to the motor; and
    an elastic member interposed between the first plate and the second plate.

12. The drive system of claim 11, wherein:
    motor brackets are installed on an outer surface of the motor; and
    the second plate of each of the respective insulators is coupled to each of the respective motor brackets.

13. The drive system of claim 1, wherein the electric vehicle is an electric truck.

14. The drive system of claim 13, wherein the electric vehicle is a hydrogen electric truck provided with a fuel cell mounted therein.

15. A drive system of an electric vehicle, the drive system comprising:
- a motor configured to drive the electric vehicle;
- one of a reducer or a transmission connected to an output side of the motor so as to change a rotational speed of the motor; and
- a rear axle configured to transmit rotating power output from the one of the reducer or the transmission to vehicle wheels,
- wherein the motor and the one of the reducer or the transmission together with the rear axle are mounted on a suspension,
- wherein the suspension is configured such that mounting brackets are fixedly installed on two vehicle body frames, a stabilizer link is coupled to lower ends of both mounting brackets, lower arms which extend in the forward and backward directions are coupled to left and right sides of the stabilizer link, a sub-frame which extends in the leftward and rightward directions is installed between the left and right lower arms, and
- wherein coupling positions between the lower arms and the sub-frame are set to be located directly under air springs such that the motor and the rear axle are moved together with the suspension by the sub-frame during behavior of the suspension and thus, load applied to parts for connecting the motor, the reducer, and the rear axle is minimized.

\* \* \* \* \*